United States Patent
Töpfer

(10) Patent No.: US 7,455,577 B2
(45) Date of Patent: Nov. 25, 2008

(54) RETENTION DEVICE WITH CRANK TRANSMISSION

(75) Inventor: Klaus Töpfer, Büttelborn (DE)

(73) Assignee: Poly-Clip System GmbH & Co. KG (DE)

( * ) Notice: Subject to any disclaimer, the term of this patent is extended or adjusted under 35 U.S.C. 154(b) by 36 days.

(21) Appl. No.: 11/468,168

(22) Filed: Aug. 29, 2006

(65) Prior Publication Data
US 2007/0072528 A1    Mar. 29, 2007

(30) Foreign Application Priority Data
Sep. 20, 2005    (DE)    ........................ 10 2005 044 879

(51) Int. Cl.
*A22C 11/00*    (2006.01)
(52) U.S. Cl. ........................................ 452/30
(58) Field of Classification Search ............ 452/30–39, 452/40–48, 51; 99/584–588, 593
See application file for complete search history.

(56) References Cited

U.S. PATENT DOCUMENTS

| | | | |
|---|---|---|---|
| 2,637,068 A * | 5/1953 | Kofler | 452/42 |
| 3,112,516 A * | 12/1963 | Bonnee | 452/29 |
| 3,748,690 A | 7/1973 | Niedecker | |
| 4,437,209 A | 3/1984 | Duroyon | |
| 4,602,402 A * | 7/1986 | Schnell | 452/31 |
| 5,573,454 A * | 11/1996 | Fox et al. | 452/29 |
| 6,524,177 B2 * | 2/2003 | Bolzacchini | 452/22 |
| 6,669,545 B1 * | 12/2003 | Hergott et al. | 452/33 |
| 6,871,474 B2 | 3/2005 | Toepfer | |
| 7,066,803 B2 * | 6/2006 | Arnote et al. | 452/32 |
| 7,182,684 B2 * | 2/2007 | Hergott et al. | 452/37 |

FOREIGN PATENT DOCUMENTS

| | | |
|---|---|---|
| DE | 20 18 454 A1 | 11/1971 |
| DE | 26 45 714 A1 | 11/1977 |
| DE | 32 06 675 A1 | 9/1983 |
| DE | 32 42 147 C2 | 8/1990 |
| DE | 101 31 807 C1 | 11/2002 |

* cited by examiner

*Primary Examiner*—Thomas Price
(74) *Attorney, Agent, or Firm*—Hanh Loeser & Parks LLP; Michael H. Minns

(57) ABSTRACT

The invention relates to a retention device comprising a support bracket that can be moved along a filling tube, for accommodating a brake ring clasped around the filling tube to exercise a frictional force on a tubular casing to be pulled off the filling tube during filling, and further comprising a drive coupled to the support bracket for moving the support bracket back and forth parallel to the filling tube. The drive comprises a crank transmission with a crank that is connected on the driven side to the support bracket.

20 Claims, 6 Drawing Sheets

RETENTION DEVICE WITH CRANK TRANSMISSION

This patent application claims priority to German patent application DE 10 2005 044 879.8-27, filed Sep. 20, 2005, hereby incorporated by reference.

TECHNICAL FIELD

The invention relates to a retention device for a filling machine of the type having a filling tube for filling a casing, wherein at least a portion of the casing is stored as needed in a bunched up accordion fashion about the filling tube. More particularly, the invention relates to a retention device comprising a support bracket; a brake ring mounted on the support bracket, the brake ring being clasped around the filling tube to selectively exercise a frictional force on the tubular casing during filling; a drive coupled to the support bracket for moving the support bracket back and forth, parallel to the filling tube; the drive comprising a crank transmission including a crank connected to the support bracket.

BACKGROUND OF THE INVENTION

When filling material such as sausage meat, putty or sealing compound is fed through a filling tube coupled to a filling machine into a tubular casing closed at one end, a sausage is formed at the filling tube exit. The casing, which was previously pulled onto the filling tube either manually or automatically or which was produced in situ from a flat web of film folded and sealed over the filling tube to form a tube, is pulled off the filling tube by the filling pressure.

The retention device of the kind initially described and adequately known to those in the art is stationarily disposed adjacent the filling tube during filling and is configured to serve as a holding and support means for a brake ring (also known as a casing brake) clasped around the filling tube. The retention device thus comprises a support bracket (casing brake holder) that is generally suitable for receiving brake rings of different diameters in order to allow adaptation to different filling tube diameters. The brake ring, which typically includes an annular rubber lip, is elastically biased against the filling tube. As a result of this bias, it presses the casing against the filling tube. This pressure generates the frictional pressure which ensures that the casing is drawn from the filling tube in a controlled manner during the filling process and that, depending on the bias of the brake ring, a sausage with the desired fullness is produced.

Located downstream from the filling device comprising the filling tube and the retention device is a device for partitioning portion packs, a so-called clip machine, which constricts the filled casing using displacement elements (referred to in brief as "displacers"), thus displacing any filling material located in the constricted portion, before one or two closure elements known as clips are then placed on the constricted portion (gathered end or tress) of the casing and closed around it by closing tools. The casing can be severed between the two clips with a knife to selectively produce either separate sausages or strings of sausages of a desired length. Two kinds of partitioning and closing devices are known: firstly, those with spreading displacement, in which after closure the displacement elements are axially moved apart in relation to the tubular casing in order to lengthen the constricted portion so that the clips can be applied. A casing partitioning and closing device that dispenses with extended tress formation in favour of simpler kinematics is known, secondly, from DE 101 31 807. This type of casing partitioning and closing device can operate at substantially higher clock rates due to its simpler kinematics.

It is known in connection with spreading displacement to retract the brake ring on the filling tube during spreading into a released position, in the opposite direction to the direction that the tubular casing is pulled off the filling tube. This is necessary in order to free a sufficient volume of the packaging into which the filling material displaced when the displacement elements are spread for closure can then escape. In the prior art, this is achieved by coupling the casing brake holder to a pneumatic drive that acts in a direction parallel to the filling tube and which retracts the brake ring together with the support bracket on the filling tube while the displacers constrict and spread the gathered end of the casing. When the partitioning and closing operation has been completed, the pneumatic drive moves the brake ring forwards again when the next filling cycle of the intermittently operating filling device begins, into a forward position close to the exit opening of the filling tube, thereby wiping the previously displaced filling material into the new tubular casing being pulled off. Partitioning and closing devices with spreading displacement usually operate at clock rates of 50 to 100 operating cycles per minute.

However, closing devices such as the portioning device known from DE 101 31 807 are unable to increase the production speed to any considerable extent. At clock rates greater than 200 cycles per minute, synchronicity and a sufficient stroke length of the back-and-forth movement of the pneumatic linear drive are no longer assured, because the working medium (air or other fluid) does not flow fast enough—in any case when the feed lines have normal dimensions—even when the valves of the pneumatic drive are precisely timed. For this reason also, extended tress formation by means of spreading displacement is dispensed with these clip machines, because not as much filling material is then displaced, and because it is also possible to dispense with any yielding movement on the part of the brake ring.

SUMMARY OF THE INVENTION

Proceeding from this basis, the object of the invention is to provide the conditions for further increasing the productivity of modern portioning devices.

This object is achieved by means of a retention device of the kind initially specified, the drive of which has a crank transmission with a crank that is connected on the driven side to the support bracket.

Whereas a pneumatic drive was sufficient for the back-and-forth movement of the support bracket in spread displacers operating at clock rates of up to 100 cycles per minute, a drive with a crank transmission is superior to a pneumatic linear drive insofar as the back-and-forth movement produced is positively coupled to the rotational drive movement, thus ensuring synchronicity with the drive unit (at every speed).

Particularly in portioning devices without spreading displacement, a yielding brake ring is also advantageous because it is then possible to dispense with intermittent filling in favor of a continuous filling process. For a given feed rate, a continuous feed pump is considerably less expensive and is less maintenance-intensive, because an intermittent filling process also imposes very high demands on the filling machine at such high clock rates, such as a fast start-up speed. For the filling displaced in a continuous filling process and also for the filling that continues to be fed while the displacers and closing tools are closing the casing, the yielding brake ring creates a volume into which the filling material can escape, with the result that the casing is not damaged, and bursts, for example, as a result.

In one advantageous development, the retention device has a connecting flange with a stub shaft that can be connected to the drive motor of a clipping device, on the one hand, and to the drive shaft, on the other hand. By this simple constructional means, using a single drive motor for both the clipping and the retention devices, and by means of the positive coupling provided by the aforementioned crank transmission, the back-and-forth movements of the retention device, and the stroke movement of the displacement elements and closing tools of the clipping device, are always synchronous with each other.

In order to prevent damage being caused to the retention device or to other drive or machine parts, despite the mechanical coupling, the drive unit for the retention device preferably includes a safety clutch. This ensures, for example, that a continuously operating drive unit does not cause any damage to the retention device or other machine components when the back-and-forth movement of the support bracket is blocked for whatever reason.

To also enable a variable stopping point for the back-and-forth movement of the support bracket and hence a variable stroke of the brake ring, the retention device preferably has a work storage device and a retarder disposed downstream therefrom in the direction of power transmission. This enables the drive unit to work in continuous operation and to continue driving the crank transmission while the retarder holds the support bracket in the desired stopping position on the driven side and the drive energy is stored in the work storage device. This helps to keep the support bracket and its brake ring in the retracted released position until the displacement elements and closing tools have cleared the way partially or wholly after clipping, regardless of the calibre of the sausage produced.

The retarder is preferably configured to act on the crank or on a driven shaft connected to the crank. According to one preferred development, the work storage device comprises a torque-resistant spring element which couples the driven shaft to a drive shaft. In this construction, the driving movement and the driven movement are decoupled in the region of the shaft assembly, and a simpler connecting rod capable of bearing high mechanical loads can be selected for translating the circular movement of the crank into the linear movement of the support bracket.

The safety clutch preferably comprises a clutch plate connecting the drive shaft to the spring element, said spring element being preferably configured as a helical compression spring that presses the clutch plate axially against the drive shaft. In this manner, the spring serving as a work storage device can also serve as a pressure means for the safety clutch. This reduces the number of moving parts.

The drive shaft advantageously includes an entrainment element that engages a corresponding entrainment element of the plate, wherein said engagement can be terminated at a specific relative angular position of the drive shaft and the driven shaft. Compared to a friction clutch, for example, this has the advantage that the drive shaft and the driven shaft are always engaged with each other by means of the spring element and the clutch plate in a relative angular position that is defined by the arrangement of the matching entrainment elements. This maintains the synchronicity and/or phase position between the drive unit of the retention device and the back-and-forth movement of the support bracket, even after the safety clutch has been applied.

As an alternative to a mechanically coupled drive motor of a clipping device, the retention device has a drive motor (of its own) coupled to the drive shaft, and an electronic controller with a control input that can be coupled to a control interface of a clipping device.

Other features and advantages of the retention device according to the invention are found in the subclaims. These shall now be explained in the following description of embodiments of the invention, with reference to the enclosed Figures, which show:

DETAILED DESCRIPTION OF THE DRAWINGS

Figure 1:
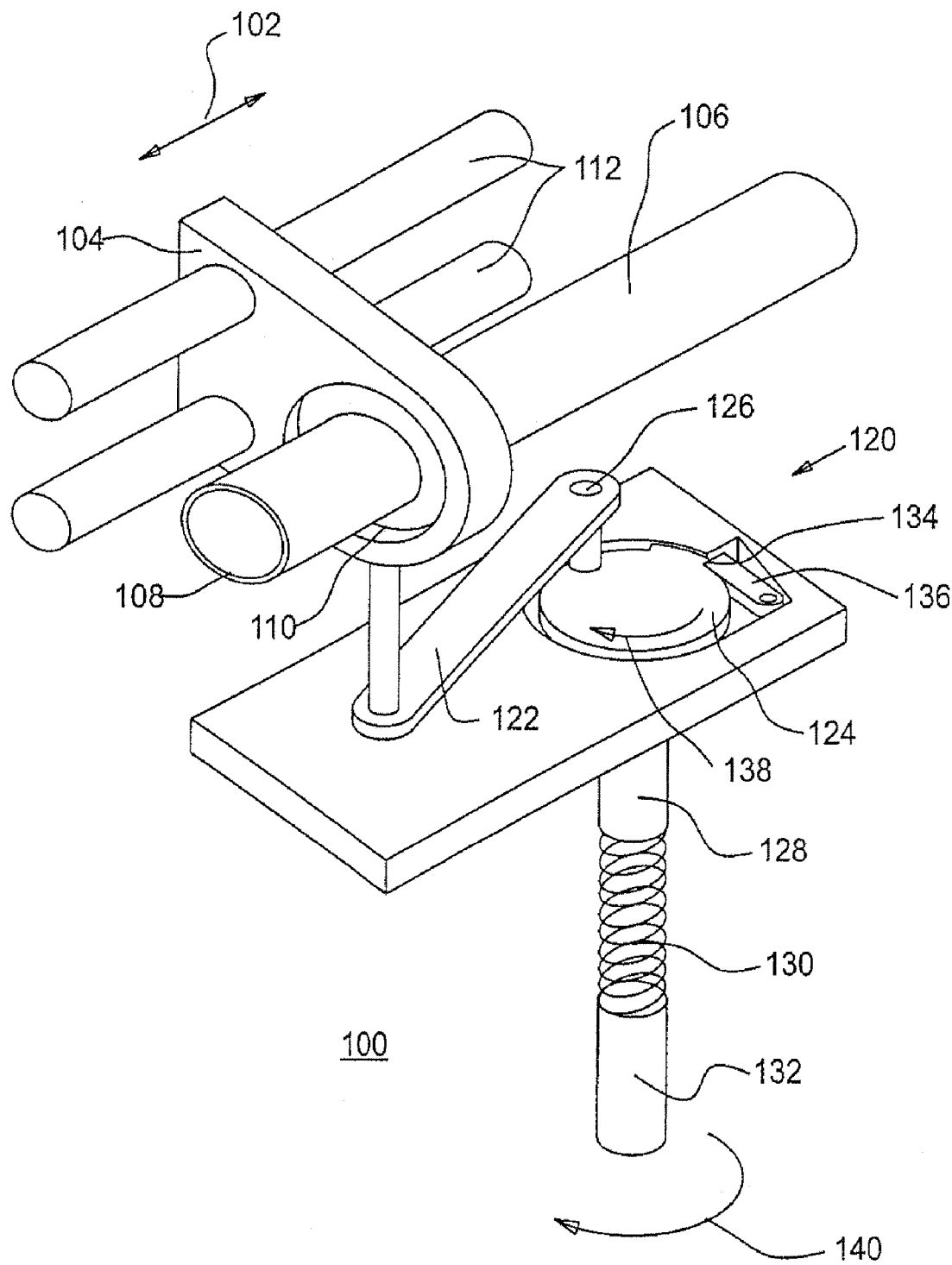
FIG. 1 is a schematically simplified, perspective view of an embodiment of the retention device according to the invention.

The retention device 100 shown in FIG. 1 has a support bracket 104 that can be moved back and forth in the direction shown by a double-headed arrow 102. The direction 102 of this linear movement coincides with the orientation, of a filling tube 106 assigned to a filling machine (not shown) in order to convey a filling material. The filling material is conveyed in the direction of a front opening 108 of filling tube 106. A casing (not shown) pulled over filling tube 106 and which is closed by a clip at its front end, is pulled off filling tube 106 by the filling pressure thus ensuing. A brake ring 110 clasping filling tube 106 is disposed inside support bracket 104. The inside of said brake ring has an elastic pressure ring that presses the casing against the filling tube 106, thus producing a frictional force when the casing is drawn off.

Support bracket 104 is guided along a rail 112 parallel to filling tube 106 in order to implement the linear movement. According to the invention, the drive for back-and-forth movement of support bracket 104 comprises a crank transmission 120 that is connected on the driven side to support bracket 104 by means of a connecting rod 122. Said crank transmission comprises a crank disk 124 with a crank pin 126, to which connecting rod 122 is pivotably attached. Crank disk 124 is connected to a driven shaft 128. Said driven shaft is driven, in turn, by a drive shaft 132 via a helical compression spring 130 (shown here in simplified schematic form).

Crank disk 124 has a lug 134 at its periphery that acts in conjunction with an elastically biased catch 136 as a rotational damper. When crank disk 124 is rotated in the direction of arrow 138 into the position shown, catch 136 prevents crank disk 124 from rotating further. When drive shaft 132 is then rotated further in the drive direction shown by arrow 140, this tightens spring 130, which is interposed as a work storage device within the power train extending from drive shaft 132 to brake ring holder 104. In this manner, crank disk 124 and hence also, via connecting rod 122, brake ring holder 104 with brake ring 110 are stopped at the desired stopping position while the drive shaft can be turned further by a drive motor.

The method performed by the retention device in FIG. 1 shall now be described with reference to the sausage production process. In the first step, the casing which is axially closed at one end is stuffed with filling material via filling tube 106 and drawn off in the process from a supply located on the filling tube, against the frictional force exerted by brake ring 110 clasping the filling tube. Brake ring 110, in conjunction with brake ring holder 104, is then driven by the crank transmission 120 back along filling tube 106 in the opposite direction to the direction in which the casing is drawn off, into a released position in order to release an amount of casing. While brake ring holder 104 and brake ring 110 are kept in the released position by means of the rotational retardation effect of catch 136, with at least a partial overlap in time, the stuffed casing is constricted by means of displacement elements (not shown) and the filling material in the constricted area is displaced into the volume of casing released. In the constricted area, one or two clips (not shown) are placed on the casing and closed around it by closing tools acting against each other (punch and die-plate, not shown). If necessary, the casing is then severed between the two clips. In a next operating cycle, the closing tools and displacement elements are moved apart again and release a larger cross-section for renewed stuffing of the following casing. During this step, the rotational block is removed by releasing catch 136 and releasing lug 134 on crank disk 124, thus allowing the support bracket 104 to be moved back to the forward position. The details of how this occurs, and the manner in which this can be synchronized with the displacement and clipping operation, shall now be described with reference to the following Figures. Releasing crank disk 124 causes the work stored in helical compression spring 130 to drive the driven shaft 128 via crank disk 124 with acceleration until the driven shaft has reached the same angular position as drive shaft 132, which has rotated further in the meantime.

The retention period (that is, the time of release) depends, inter alia, on the calibre of the sausage being produced, and is adjusted according to experience. Care must be taken to ensure that brake ring 110 is not moved into the forward position too early, in other words when the sausage is still in the closed state, or while the displacement elements are being opened. Otherwise there is a risk that the casing will burst, because the filling material in the released volume is pressed against the (partially) closed displacement elements.

The stopping point, in contrast, that is to say the position where the catch is located or engages the crank disk, is selected such that the released volume corresponds as exactly as possible to the volume of filling material displaced during partitioning and closing and, where relevant, the volume of filling material which continues to be stuffed during continuous stuffing, so that the weight of the portion (sausage) is achieved as precisely as possible.

In place of the helical compression spring 130 between drive shaft 132 and driven shaft 128, the work storage device can also be disposed in principle at any other place within the power train from the drive shaft to the brake ring holder 104. For example, it can be disposed in the area of the connecting rod. What is critical in this case is that the back-and-forth movement of support bracket 104 is retarded downstream therefrom in the direction of power transmission; in this example, support bracket 104 would have be stopped immediately at a particular stopping point, for example in the area of rail 112.

Figure 2:
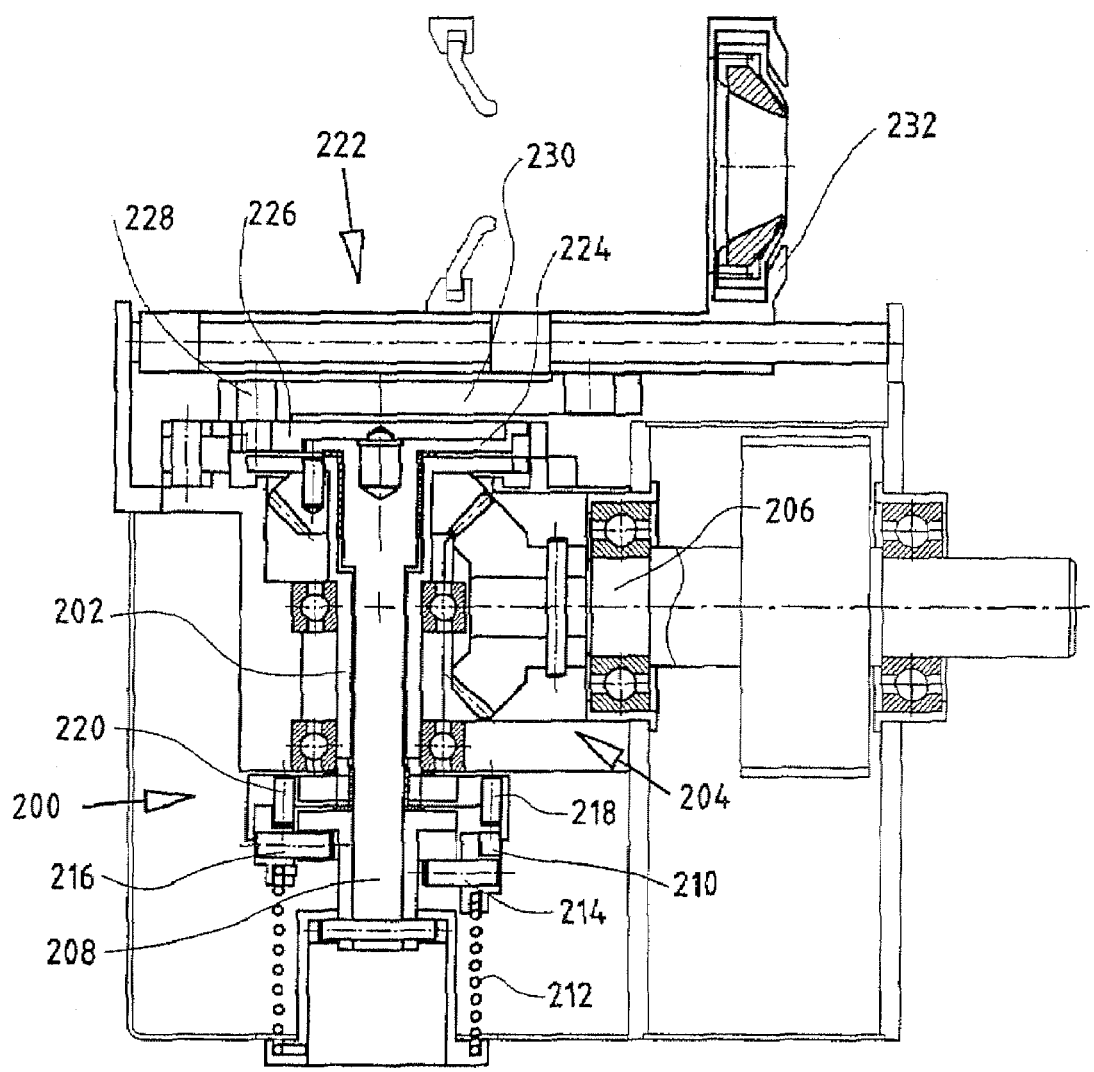
FIG. 2 is a sectional view of another embodiment of the retention device according to the invention.

FIG. 2 shows a possible embodiment of the inventive crank transmission 200. Said crank transmission comprises a drive shaft 202 configured as a hollow shaft. A bevel gear 204 connects drive shaft 202 to an input shaft 206 the free stub shaft of which is guided outside to connect to the drive motor of a clipping device. Driven shaft 208 is mounted inside hollow drive shaft 202. Drive shaft 202 is frictionally connected to driven shaft 208 initially by means of a clutch ring 210 and a helical compression spring 212 connected thereto.

The method of operation of said clutch ring 210 shall be ignored for the present and it shall be assumed that it always rotates with drive shaft 202. In this case, rotational movement is transferred as in the example shown in FIG. 1. The drive shaft transfers the rotational movement by means of clutch ring 210 to torsion spring 212, which drive shaft 208 causes to turn in the direction of rotation. Helical compression spring 212 is preferably biased against the direction of drive transmission, such that when there is no requirement for greater torque on the driven side the driven shaft is rotated without delay or phase shift in relation to the rotation of drive shaft 202.

If drive shaft 208 is stopped directly or in the area of the crank by a retarder, spring 212 becomes further biased by drive shaft 202 continuing to turn. If driven shaft 202 and the crank are then released again, the work stored in spring 212 is released and driven shaft 208 begins to rotate again in synchrony with the rotational movement of drive shaft 202.

The clutch plate performs several functions. Firstly, it is coupled to the driven shaft via spring 212 and via two entrainment elements 214, 216 in the form of pins and two matching contact surfaces on the driven shaft. The stop thus formed enables the aforementioned bias in spring 212. A fixed relative angular position of the drive shaft and the driven shaft is thus defined, into which the driven shaft is returned again and again after the retarder is released. This particular aspect is described in greater detail below with reference to FIG. 6.

Secondly, clutch plate 210 and drive shaft 202 are coupled by means of two entrainment elements 218, 220 located on drive shaft 202 and by matching entrainment elements in the form of bores on clutch plate 210. In the normal operating state, the clutch plate and the drive shaft rotate together. However, the engagement of entrainment elements 218, 220 with the matching entrainment elements on clutch plate 210 is terminated when the drive shaft and the driven shaft are in a specific angular position relative to each other. This occurs in the event of overloading, when the clutch plate is lifted axially downwards against a compressive force that is likewise exerted by the helical compression spring 212, as illustrated in the right-hand half of the cross-sectional drawing. Further details of this mechanism are likewise provided with reference to FIG. 6. The spring element, namely helical compression spring 212, is thus used, firstly, as a work storage device by virtue of its torsion spring effects, and secondly, by virtue of its compression spring effects, to press the safety clutch otherwise provided by the clutch plate.

In its upper region, driven shaft 208 is connected to a crank 222. Crank 222 is in two parts and consists of a crank disk 224 with a carriage guide and a carriage 226 bearing crank pin 228. Carriage 226 and crank pin 228 rotate with crank disk 224 and are therefore fixedly coupled to driven shaft 208. The linear carriage guide has the effect that the crank pin, in addition to its rotational movement within the angular position provided for it, is able to perform a linear movement in order to move the support bracket and hence also the brake ring accommodated therein into a free-running position in front of the filling tube in order to release the filling tube so that it can be loaded with a new casing. Further details are provided below with reference to FIG. 5. Connecting rod 230 is pivotably mounted on crank pin 228, said connecting rod being hingedly connected at the end distal from crank pin 228 to the linearly guided brake ring holder 232.

Figure 3:
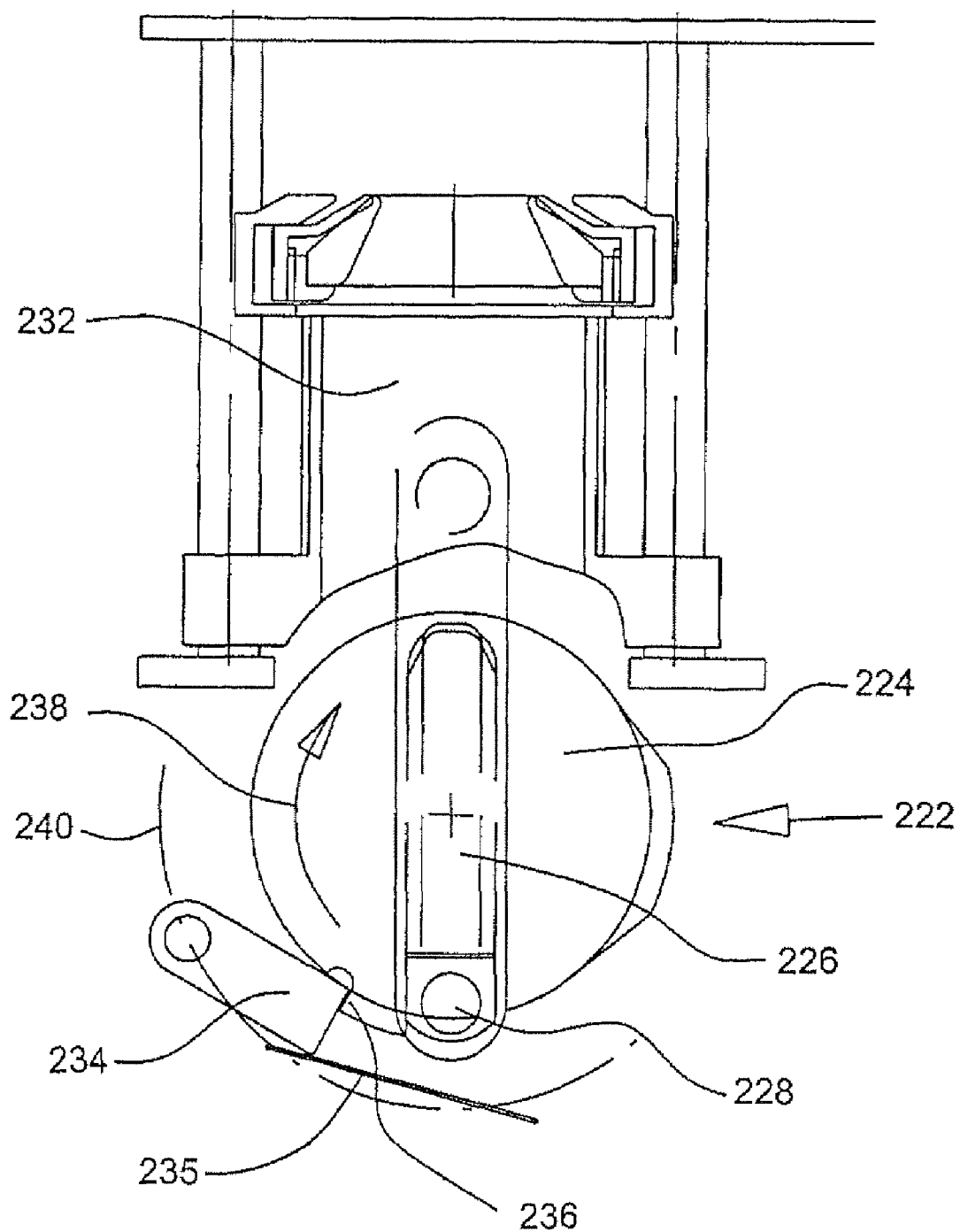
FIG. 3 is a plan view of the retention device in FIG. 2, in a first angular position of the crank.

FIG. 3 shows a plan view of the embodiment of the inventive retention device of FIG. 2. In the Figure, crank 222 is in an angular position in which the linear guide of carriage 226 is oriented parallel to the direction of guidance and movement of brake ring holder 232, and crank pin 228 and hence the brake ring holder are disposed in a rearward position distal from the end of the filling tube (not shown). In this position, catch 234 engages shoulder 236 in crank 222 and prevents the latter from rotating further in the drive direction shown by arrow 238. The catch is springly biased by means of a spring 235 and snaps automatically into the locked position. The catch is also adjustable within a segment 240 of its angular position relative to crank 222, in a manner not shown in further detail, such that the angular position of the crank can be changed in respect of the stopping point. It is thus possible to stop brake ring holder 232 at any desired stopping point within a stroke range corresponding to segment 240 while the casing is being displaced and closed. The stopping point is determined such that the effective stroke is adjusted to an amount corresponding to the displaced volume, in order to achieve maximum precision in the reproducibility of each filling operation and in this way to enhance the weight precision of the stuffed and clipped portion packs.

Figure 4:
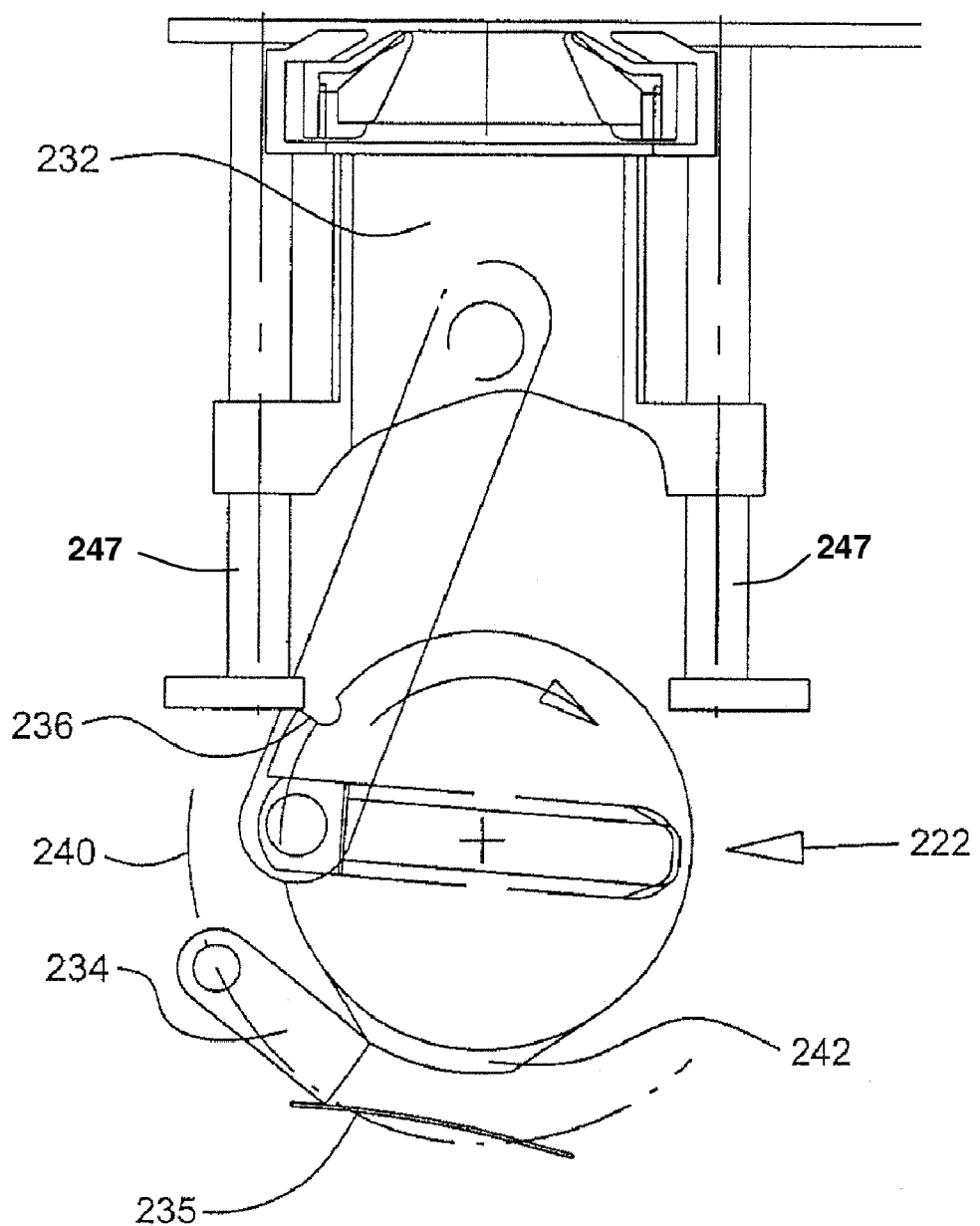
FIG. 4 is a plan view of the retention device in FIG. 2, in a second angular position of the crank that has been advanced by 90°.

FIG. 4 shows a plan view of the retention device with crank 222 in a different position. The arrangement is shown in its position shortly after the time at which the engagement of catch 234 with shoulder 236 is terminated by means of a cam disk 242 connected to the permanently rotating drive shaft 202 (not visible in FIG. 4), and at which crank 222 is released for rotation (trigger time). The retarder (catch 234) and drive shaft 202 communicate in this manner by means of a curve control (cam disk 242). Due to drive shaft 202 continuing to rotate, the tension in spring 212 has meanwhile increased again. After the crank is released, driven shaft 208 bearing crank 222 follows drive shaft 202 as far as the angular position shown, due to the work stored in the spring.

Corresponding to the angular position of crank 222 as shown, brake ring holder 232 is half way into the forward position near the end of the filling tube. The phase shift between the stopping point and the trigger point is determined by the relative angular position of lug 236 and the point on cam disk 242 that disengages the catch from lug 236. In the present embodiment, the phase difference is approximately 90°.

Figure 5:
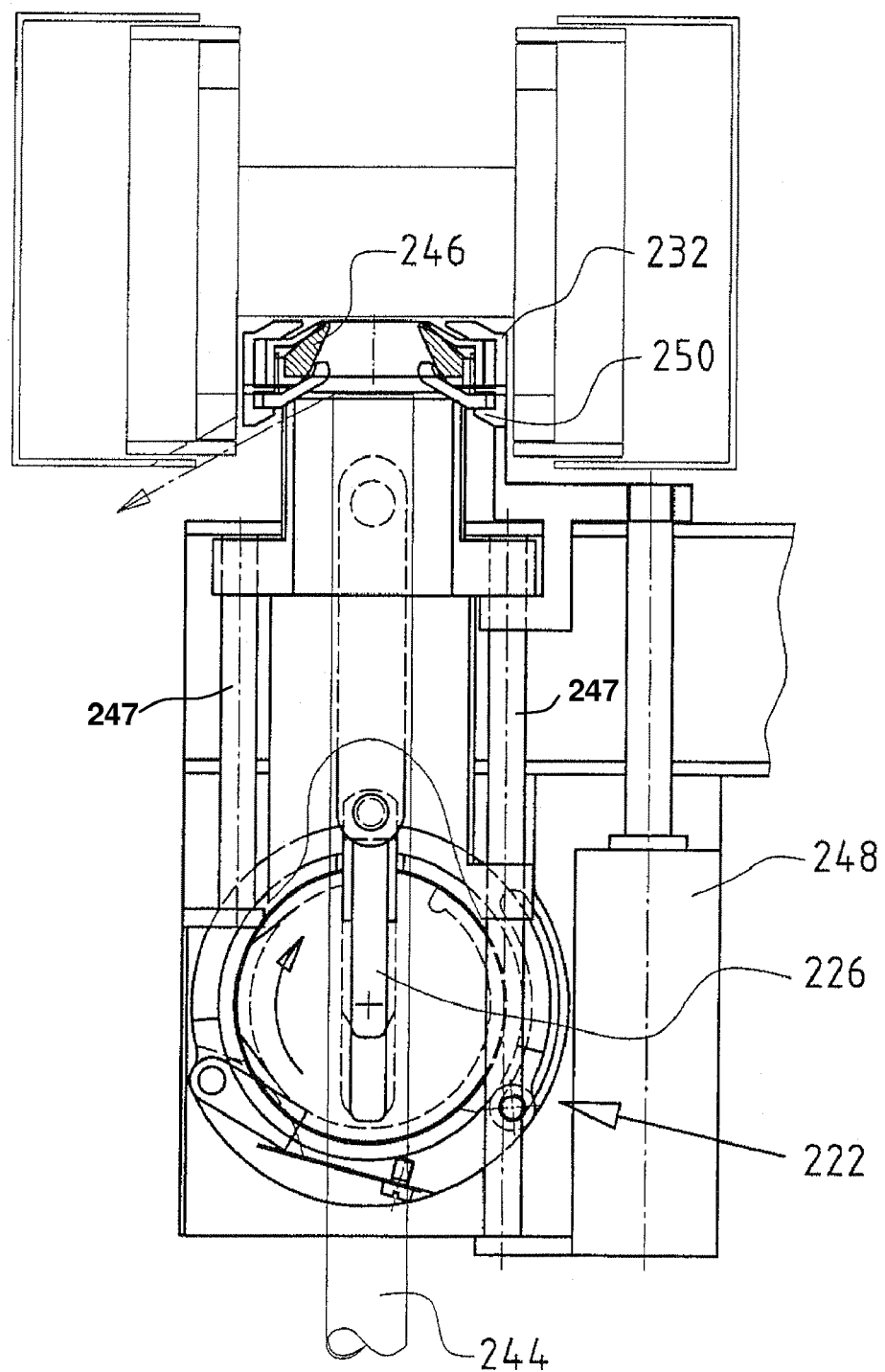
FIG. 5 is a plan view of the retention device in FIG. 2 in a free-running position.

FIG. 5 shows the same embodiment but in a different angular position, in which brake ring holder 232 has reached its forward position close to the end of the filling tube. In this view, the filling tube is shown with the reference numeral 244. The position shown in FIG. 5 is not an operating position, but a maintenance position in which the carriage 226 of crank 222 is pulled out to the front. Brake ring holder 232, with brake ring 246 disposed therein, is pulled off the filling tube in this manner from the forward position of its back-and-forward movement and further in the pull-off direction into a free-running position, such that filling tube 244 can be hinged out of the working position as shown so that it can be loaded with a new supply of tubular casing. To this end, support bracket 232 is coupled to a linear drive 248 in the form of a pneumatic cylinder/piston arrangement. This directly moves a retention ring 250 disposed upstream from brake ring 246, said retention ring serving as a retention means to hold back a supply of tubular casing provided on the filling tube. If said retention ring contacts brake ring holder 232 either directly or indirectly due to actuation of the linear drive, both are moved together into the free-running position shown. The reverse is the case when the retention ring is retracted. In a first step, retention ring 250 is retracted until its holder contacts a matching portion of brake ring holder 232, and these move backwards together with retention ring 250 into the forward position on guide 247.

Figure 6:
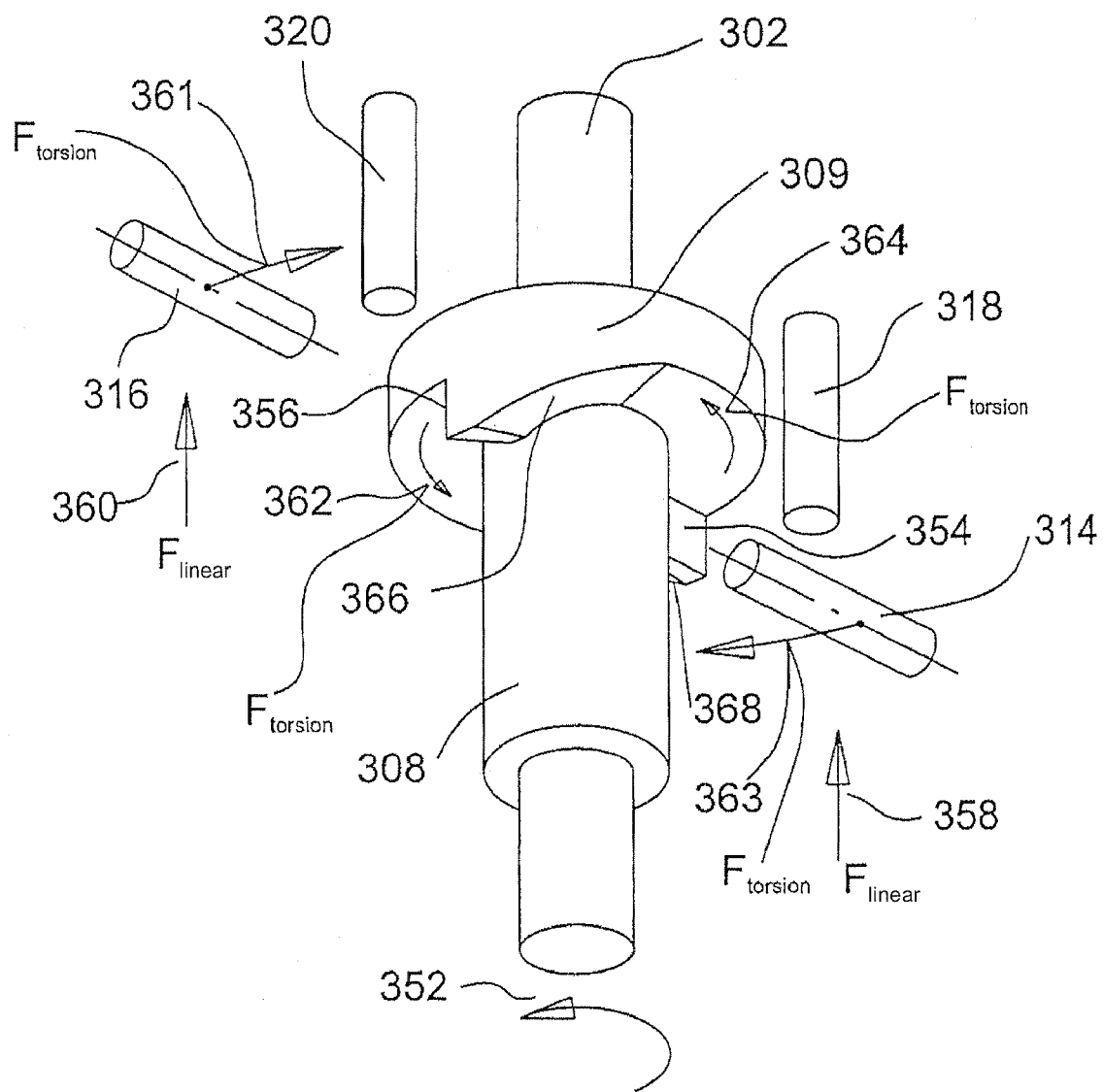
FIG. 6 is a schematically simplified, perspective illustration of the method of operation of the safety clutch of the retention device according to the invention.

FIG. 6 shows a schematically simplified exploded view of an embodiment of the safety clutch for the drive of the retention device. This is reduced to the relevant components for disengaging the coupling between the drive shaft and the driven shaft. These include, on the one hand, a section of drive shaft 302 and a pair of entrainment elements 318, 320 arranged opposite each other and which are connected in a manner not shown to drive shaft 302. Said entrainment elements rotate with drive shaft 302 in the direction shown by arrow 352. Said components also include a portion of driven shaft 308 and a cam disk 309 connected to said driven shaft 308. The other components, not shown in detail, are clutch plate 210 and the spring element or helical compression spring 212, which couple drive shaft 302—or, more precisely, clutch plate 210—to driven shaft 308. For the sake of simplification, the figure shows only pairs of opposite entrainment elements 314, 316 instead of the clutch plate, said entrainment elements being connected on the one hand to corresponding entrainment elements in the form of shoulders 354, 356 in the curve of disk 309, and on the other hand to entrainment elements 318, 320, which are connected to the drive shaft.

The spring element (not shown) exerts in combination a linear compressive force $F_{linear}$, indicated by arrows 358, 360, on the clutch plate and entrainment elements 314, 316 in the direction of disk 309 of driven shaft 308. It also exerts a torsional force $F_{torsion}$, indicated by arrows 362, 364, on driven shaft 308 and hence also on disk 309, which biases shoulders 354, 356 against entrainment elements 314, 316. As a result, the torsional force is applied to the latter in the reverse direction 361, 363. If drive shaft 302 and hence entrainment elements 318, 320 are now driven in the direction shown by arrow 352, they entrain the clutch plate, i.e. entrainment elements 314, 316, in the direction of rotation. Due to torsional force $F_{torsion}$ 362, 364, driven shaft 308 follows this rotation, with the result that shoulders 354, 356 always abut entrainment elements 314, 316. If rotation of the crank and hence of driven shaft 308 is now blocked, cam disk 309 remains stationary while the drive shaft and hence all the entrainment elements 314, 316, 318, 320 continue to turn. In doing so, entrainment elements 314, 316 of the clutch plate brush over the three-dimensional curves 366, 368 on cam disk 309 (actually a cylinder cam), whereby said curves increase downwards in height from the plane of cam disk 309. This causes entrainment elements 314, 316 together with the clutch plate to be likewise guided downwards, until an angular position is reached in which entrainment elements 318, 320 of drive shaft 302 no longer engage with corresponding entrainment elements 314, 316 of the clutch plate, such that the latter is released for rotation. This, in turn, causes entrainment elements 314, 316 of the clutch plate to snap back into the engaged position with shoulders 354, 356 due to the torsional force $F_{torsion}$ 361, 363. This process can be repeated, without damaging the transmission, until the crank and hence driven shaft 308 is released again for rotation.

In each of the disengagement processes for the safety clutch as described in the foregoing, the drive shaft and the driven shaft turn relative to each other by 180° due to the twofold symmetry. This would disturb the synchronicity between the drive and the back-and-forth movement of the brake ring holder. To prevent this from happening, it is appropriate to configure the entrainment between entrainment elements 318 and 314, for the one part, and 316 and 320, for the other part, in such a way that such entrainment occurs only in the case of full 360° rotation. As can be seen from FIG. 2, this problem can be solved by giving different radii to entrainment elements 218, 220 and to the corresponding bores in clutch plate 210.

The safety clutch is not limited, of course, to the embodiment shown in FIG. 6. The safety clutch can also be installed at any other position in the drive train, and be configured differently, for example as a friction clutch. However, the embodiment shown combines the safety clutch advantageously with the work storage device in the form of a helical compression spring, which incorporates not only torque resistance but also pressure resistance.

On the other hand, one can dispense with these advantages yet remain within the scope of the invention if, deviating from the embodiment shown in FIG. 1, any other torque-resistant spring element, such as a coil spring, is used instead of helical compression spring 130.

As an alternative to the embodiment shown, connecting rod 122 can also engage by means of an element that is fixedly connected to brake ring holder 104, in that crank pin 126 engages a slot oriented transversely to the guided direction, said slot compensating the movement vertical to the back-and-forth movement of brake ring 110. However, the disadvantage of this configuration is that more noise and greater wear are caused due to the greater freedom of movement of those elements which move in relation to each other, namely crank pin 126 and the fixed connector element on support bracket 104.

The invention claimed is:

1. A retention device comprising:
 a support bracket that can be moved along a filling tube, and a brake ring supported by the support bracket and clasped around the filling tube to exercise a frictional force on a tubular casing to be pulled off the filling tube during filling, and
 further comprising a rotary drive coupled to the support bracket for moving the support bracket and brake ring back and forth parallel to the filling tube,
 the drive comprising a crank transmission with a rotatable crank connected on a driven side to the support bracket.

2. The device of claim 1, wherein the retention device comprises a work storage device and a retarder disposed downstream therefrom in the direction of power transmission in order to stop the support bracket at a stopping point.

3. The device of claim 2, wherein the retarder is configured to act on the crank or on a driven shaft connected to the crank in order to stop the crank at said stopping point.

4. The device of claim 3, wherein the retarder is configured to be adjustable in its position relative to the crank, such that the angular position of the crank at the stopping point can be varied.

5. The device of claim 3, wherein the work storage device comprises a torque-resistant spring element coupling the driven shaft to a drive shaft.

6. The device of claim 5, wherein the spring element is biased against the drive direction.

7. The device of claim 5, wherein the retarder and the drive shaft communicate by means of a cam curve control configured to terminate the action of the retarder on the crank or the driven shaft.

8. The device of claim 5, wherein the drive has a safety clutch.

9. The device of claim 8, wherein the safety clutch comprises a clutch plate which connects the drive shaft to the spring element.

10. The device of claim 9, wherein the spring element is configured as a helical compression spring that presses the clutch plate axially against the drive shaft.

11. The device of claim 10, wherein the drive shaft includes an entrainment element that engages a corresponding entrainment element of the clutch plate, wherein said engagement of the entrainment element can be terminated at a specific relative angular position of the drive shaft and the driven shaft.

12. The device of claim 11, wherein the clutch plate and the driven shaft communicate by means of a cam curve control configured to move the clutch plate axially against a pressure exerted by the spring during relative rotation of the drive shaft and the driven shaft, thereby terminating the engagement of the entrainment elements of the drive shaft and the clutch plate at the specific relative angular position.

13. The device of claim 5 further comprising:
 a connecting flange with a stub shaft that can be connected to a drive motor of a clipping device, on the one hand, and to the drive, on the other hand.

14. The device of claim 13, wherein the retention device has a drive motor coupled to the drive, and an electronic controller with a control input that can be coupled to a control interface of the clipping device.

15. The device of claim 1, further comprising:
 a linear drive coupled to the support bracket and configured to drive the support bracket from its forward position of the back-and-forth movement, in the pull-off direction, further in the pull-off direction into a free-running position in which the brake ring is pulled off the filling tube, and back into the forward position.

16. The device of claim 15, wherein the crank comprises a linear guide on a carriage of which a pin of the crank is disposed for movement between a position corresponding to the forward position and the free-running position of the support bracket.

17. The device of claim 15 further comprising:
 a retention means disposed upstream from the support bracket for restraining a supply of casing located on the filling tube.

18. The device of claim 17, wherein the linear drive is coupled with the retention means.

19. The device of claim 1, wherein the crank is connected by means of a connecting rod to the support bracket.

20. A retention device for a filling machine having a filling tube for filling a tubular casing, wherein at least a portion of the casing is stored as needed in a bunched up accordion fashion about the filling tube, the retention device comprising:
 a support bracket;
 a brake ring mounted on the support bracket, the brake ring being clasped around the filling tube to selectively exercise a frictional force on the tubular casing during filling;
 a rotary drive coupled to the support bracket for moving the support bracket and brake ring mounted thereon back and forth, parallel to the filling tube;
 the drive comprising a crank transmission including a rotatable crank connected to the support bracket.

* * * * *